(12) United States Patent
Tokuhara

(10) Patent No.: US 8,320,830 B2
(45) Date of Patent: Nov. 27, 2012

(54) TAPE-FORM COMMUNICATION SHEET AND INFORMATION PROCESSING DEVICE USING THE TAPE-FORM COMMUNICATION SHEET

(76) Inventor: Tsunemi Tokuhara, Kodaira (JP)

( * ) Notice: Subject to any disclaimer, the term of this patent is extended or adjusted under 35 U.S.C. 154(b) by 909 days.

(21) Appl. No.: 12/311,517

(22) PCT Filed: Oct. 20, 2007

(86) PCT No.: PCT/JP2007/070492
§ 371 (c)(1),
(2), (4) Date: Apr. 2, 2009

(87) PCT Pub. No.: WO2008/050694
PCT Pub. Date: May 2, 2008

(65) Prior Publication Data
US 2010/0082870 A1 Apr. 1, 2010

(30) Foreign Application Priority Data
Oct. 23, 2006 (JP) ................................. 2006-287100

(51) Int. Cl.
*H04B 5/00* (2006.01)
(52) U.S. Cl. ... 455/41.1; 455/41.2; 455/557; 455/575.6; 455/576.5; 455/572; 455/573; 710/305; 713/300; 361/724; 361/688; 361/719
(58) Field of Classification Search ................. 455/41.1, 455/41.2, 557, 575.5, 575.7, 572, 573
See application file for complete search history.

(56) References Cited

U.S. PATENT DOCUMENTS

| | | | | |
|---|---|---|---|---|
| 4,811,082 | A | * | 3/1989 | Jacobs et al. ................... 257/700 |
| 5,032,896 | A | * | 7/1991 | Little et al. ..................... 257/686 |
| 5,620,782 | A | * | 4/1997 | Davis et al. .................... 428/209 |

(Continued)

FOREIGN PATENT DOCUMENTS

JP 2006-67429 3/2006

(Continued)

OTHER PUBLICATIONS

International Search Report issued Jan. 22, 2008 in the International (PCT) Application of which the present application is the U.S. National Stage.

*Primary Examiner* — Marceau Milord
(74) *Attorney, Agent, or Firm* — Wenderoth, Lind & Ponack, LLP

(57) ABSTRACT

It is an object to provide a transmission system that is more suitable for transmission of a large volume of data than a cable or an optical fiber is and capable of coupling a transmission path and an electronic device easily without using a connector. A tape-form communication sheet is configured by a sheet body, plural coupling nodes regularly arranged in line and fitted in the sheet body, and a signal transmission wiring, wherein an interface of a computer having the interface similar to this coupling node is connected to the coupling node of the tape-form communication sheet for transmitting a signal. The coupling nodes are configured by an arrayed antenna and a communication circuit unit including a signal In/Out unit, a memory, a signal reception/output unit, and a CPU connected to the signal In/Out unit, the memory, and the signal reception/output unit, wherein the signal transmission wiring is connected to the signal In/Out unit of the respective coupling nodes.

23 Claims, 14 Drawing Sheets

U.S. PATENT DOCUMENTS

| | | | | |
|---|---|---|---|---|
| 5,870,289 | A * | 2/1999 | Tokuda et al. | 361/779 |
| 6,549,414 | B1 * | 4/2003 | Tokuhara et al. | 361/719 |
| 6,631,069 | B2 * | 10/2003 | Yang et al. | 361/306.3 |
| 6,687,128 | B2 * | 2/2004 | Tokuhara | 361/724 |
| 6,947,293 | B2 * | 9/2005 | DiBene et al. | 361/803 |
| 7,107,361 | B2 * | 9/2006 | Tokuhara | 709/253 |
| 7,245,507 | B2 * | 7/2007 | DiBene et al. | 361/803 |
| 7,368,343 | B2 * | 5/2008 | Yang | 438/238 |
| 7,609,501 | B2 * | 10/2009 | Anthony et al. | 361/118 |

FOREIGN PATENT DOCUMENTS

| | | |
|---|---|---|
| JP | 2007-159082 | 6/2007 |
| WO | 2007/066405 | 6/2007 |
| WO | 2008/050694 | 5/2008 |

* cited by examiner

F I G. 12
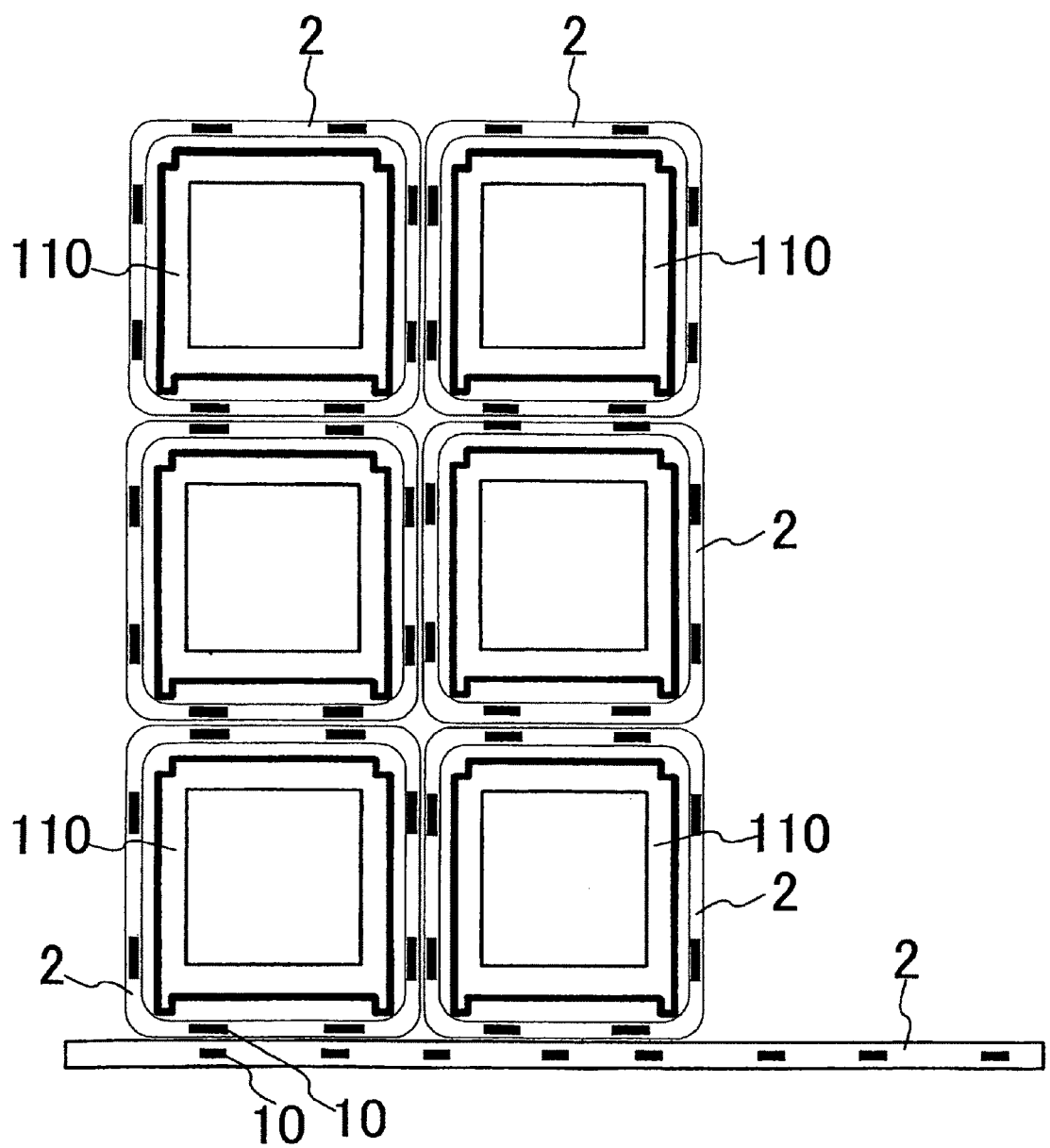

TAPE-FORM COMMUNICATION SHEET AND INFORMATION PROCESSING DEVICE USING THE TAPE-FORM COMMUNICATION SHEET

FIELD OF THE INVENTION

The present invention relates to a tape-form communication sheet and an information processing device using the tape-form communication sheet.

BACKGROUND OF THE INVENTION

As a network electrical transmission system for electrically connecting an electronic device and an electronic device, conventional well-known technologies are an Ethernet (registered trademark) cable electrical transmission network system and an optical fiber network transmission system. (Refer to e.g. Patent Documents 1 and 2)

Patent Document 1: Japanese Unexamined Patent Publication No. 2005-244830

Patent Document 2: Japanese Unexamined Patent Publication No. 2003-32195

SUMMARY OF THE INVENTION

An object of the present invention is to provide a transmission system that is more suitable for transmission of a large volume of data than a cable or an optical fiber and is capable of coupling a transmission path and an electronic device easily without using a connector.

Means for Solving Problem

In order to achieve the above object, according to the present invention, a tape-form communication sheet comprises: a sheet body of a tape form, coupling nodes which are fitted in the sheet body and are regularly lined in a plurality of rows; and a signal transmission wiring, wherein a computer having an interface similar to the coupling node or a device fitted with a computer is adjacent to the coupling nodes for transmitting a signal, the coupling nodes, comprising:

a communication circuit unit comprising a signal In/Out unit, a memory, a signal reception/output unit, and CPU that is connected to the signal In/Out unit, the memory, and the signal reception/output unit; and an arrayed antenna which are connected to the signal reception/output unit of the communication circuit unit and arranged in face to at least one surface of the sheet body, wherein the signal transmission wiring is connected to the signal In/Out unit of the respective coupling nodes.

Further according to the present invention, a tape-form communication sheet comprises: a sheet body of a tape form; coupling nodes which are fitted in the sheet body and regularly lined in a plurality of rows; a signal transmission wiring, and a power transmission wiring which is entirely fitted along the sheet body in a longitudinal direction, wherein a computer having an interface similar to the coupling node or a device fitted with the computer is adjacent to the coupling nodes for transmitting a signal and transmitting power, the coupling nodes, comprising:

a communication circuit unit comprising a power In/Out unit, a signal In/Out unit, a memory, a generator/rectifier, a signal reception/output unit, a charge/discharge battery, and CPU connected to the power In/Out unit, the signal In/Out unit, the generator/rectifier, the signal reception/output unit, and the charge/discharge battery through a selector; and an arrayed antenna which is connected to the generator/rectifier, and the signal reception/output unit of the communication circuit unit and arranged in face to at least one surface of the sheet body, wherein the signal transmission wiring is connected to the signal In/Out unit of the respective coupling nodes, and the power transmission wiring is connected to the power In/Out unit of the respective coupling nodes.

Further, according to the present invention, the sheet body is a multilayer structure comprising: a protection layer which is formed of transparent plastic material and arranged on both surfaces of the sheet body; a conductive layer which is formed of conductive plastic and arranged between the protection layers on the both surfaces; an insulation layer which is formed of an insulative plastic material, adjacent to the conductive layer in a direction of accumulation, and arranged between the protection layers on the both surfaces, and the coupling node is fitted in the insulation layer.

Further according to the present invention, the arrayed antenna has functions of sending and receiving electromagnetic wave, magnetic field signal, electric field signal, or ultrasonic wave, and the signal reception/output unit connected to the arrayed antenna corresponds to these functions.

Further according to the present invention, the arrayed antenna has functions of sending and receiving electromagnetic wave, magnetic field signal, electric field signal, or ultrasonic wave, and the generator/rectifier and the signal reception/output unit correspond to these functions.

Further according to the present invention, an external interface circuit is fitted in the sheet body and the external interface circuit is connected to the signal transmission wiring.

Further according to the present invention, an external interface circuit is fitted in the sheet body and the external interface circuit is connected to the signal transmission wiring.

Further according to the present invention, a power input/output terminal and an external interface terminal are provided in an end portion of the sheet body, the power transmission wiring is connected to the power input/output terminal, and the external interface circuit is connected to the external interface terminal.

Further according to the present invention, in the coupling node, the arrayed antenna is adjacent to the communication circuit unit in a thickness direction of the sheet body.

Further according to the present invention, the sheet body includes a coupling node which is configured by the arrayed antenna adjacent to a side of the communication circuit unit.

Further according to the present invention, an information processing device using a tape-form communication sheet comprises coupling nodes, the coupling nodes, comprising:

a communication circuit unit, comprising a signal In/Out unit, a memory, a signal reception/output unit, and CPU connected to the signal In/Out unit and the signal reception/output unit; and an arrayed antenna which are connected to the signal reception/output unit of the communication circuit unit, wherein the coupling nodes are fitted in a sheet body of the tape-form communication sheet and regularly lined in a plurality of rows, a signal transmission wiring is fitted entirely along the sheet body in a longitudinal direction, the signal transmission wiring connects to the signal In/Out unit of the respective coupling nodes, wherein the communication sheet is attached to a wall surface of a building, a central control device and a power supply device which have the same interface as the coupling node of the communication sheet are adjacent and coupled to the coupling node of the communication sheet, a controlled device having the same interface as the coupling node of the communication sheet is adjacent to an portion of the wall surface attached with the communication sheet, and a variety of digital contents are transmitted from the central control device to the controlled device through the communication sheet.

Further according to the present invention, an information processing device using a tape-form communication sheet comprises coupling nodes, the coupling nodes, comprising:

a communication circuit unit comprising a power In/Out unit, a signal In/Out unit, a memory, a generator/rectifier, a signal reception/output unit, a charge/discharge battery, and CPU which is connected to the power In/Out unit, the signal In/Out unit, the generator/rectifier, the signal reception/output unit, and the charge/discharge battery through a selector; and an arrayed antenna connected to the generator/rectifier and the signal reception/output unit of the communication circuit unit, wherein the coupling nodes are fitted in a sheet body of the tape-form communication sheet and regularly lined in a plurality of rows, a signal transmission wiring and a power transmission wiring are fitted entirely along the sheet body in a longitudinal direction, the signal transmission wiring connects to the signal In/Out unit of the respective coupling nodes, and the power transmission wiring connects to the power In/Out unit of the respective coupling nodes, wherein the communication sheet is attached to a wall surface of a building, a central control device and a power supply device which have the same interface as the coupling node of the communication sheet are adjacent and connected to the coupling node of the communication sheet, a controlled device having the same interface as the coupling node of the communication sheet is adjacent to a portion of the wall surface attached with the communication sheet, a variety of digital contents are transmitted from the central control device to the controlled device through the communication sheet, and power is transmitted from the power supply device to the controlled device through the communication sheet.

Further according to the present invention, the controlled device is made to be a music player having the interface of the same configuration as the coupling node, and music digital content is transmitted from the central control device to a hard disk of the music player through the communication sheet.

Further according to the present invention, an information processing device using a tape-form communication sheet comprises coupling nodes respectively forming a network, the coupling nodes, comprising:

a communication circuit unit comprising a signal In/Out unit, a memory, a signal reception/output unit, and CPU which is connected to the signal In/Out unit, the memory, and the signal reception/output unit; and an arrayed antenna which is connected to the signal reception/output unit of the communication circuit unit, wherein the coupling nodes are fitted in a sheet body of the tape-form communication sheet and regularly lined in a plurality of rows, a signal transmission wiring is fitted entirely along the sheet body in a longitudinal direction, the signal transmission wiring connects to the signal In/Out unit of the respective coupling nodes, and the respective coupling nodes form a network, wherein a same interface as the coupling node of the communication sheet is arranged on and mutually connected to respective surfaces of a container through a router, the containers are adjacent to each other for forming a network through the interface, at least one container among a plurality of accumulated containers is adjacent and coupled with the coupling node of the communication sheet, a central control device and a power supply device which have the same interface as the coupling node of the communication sheet are adjacent and coupled with the communication sheet and apart from the container of the communication sheet, and signal is mutually transmitted between the central control device and the container for managing the container.

Further according to the present invention, an information processing device using a tape-form communication sheet comprises coupling nodes, the coupling nodes, comprising:

a communication circuit unit comprising a power In/Out unit, a signal In/Out unit, a memory, a generator/rectifier, a signal reception/output unit, a charge/discharge battery, and CPU which is connected to the power In/Out unit, the signal In/Out unit, the generator/rectifier, the signal reception/output unit, and the charge/discharge battery through a selector; and an arrayed antenna connected to the generator/rectifier and the signal reception/output unit of the communication circuit unit, wherein the coupling nodes are fitted in a sheet body of the tape-form communication sheet and regularly lined in a plurality of rows, a signal transmission wiring and a power transmission wiring are fitted entirely along the sheet body in a longitudinal direction, the signal transmission wiring connects to the signal In/Out unit of the respective coupling nodes, and the power transmission wiring connects to the power In/Out unit of the respective coupling nodes, wherein a same interface as the coupling node of the communication sheet is arranged on and mutually connected to respective surfaces of a container through a router, the containers are adjacent to each other for forming a network through the interface, at least one container among a plurality of accumulated containers is adjacent and coupled with the coupling node of the communication sheet, a central control device and a power supply device which have the same interface as the coupling node of the communication sheet are adjacent and coupled with the communication sheet and apart from the container of the communication sheet, power is supplied from the power supply device to the interface of the container through the communication sheet, and signal is mutually transmitted between the central control device and the container for managing the container.

Further according to the present invention, an information processing device using a tape-form communication sheet comprises coupling nodes, the coupling nodes, comprising:

a communication circuit unit comprising a signal In/Out unit, a memory, a signal reception/output unit, and CPU which is connected to the signal In/Out unit, the memory, and the signal reception/output unit; and an arrayed antenna which is connected to the signal reception/output unit of the communication circuit unit, wherein the coupling nodes are fitted in a sheet body of the tape-form communication sheet and regularly lined in a plurality of rows, a signal transmission wiring is fitted entirely along the sheet body in a longitudinal direction, and the signal transmission wiring connects to the signal In/Out unit of the respective coupling nodes, wherein a short communication sheet which is made by cutting the communication sheet in appropriate length is wound around a container for forming an interface on the respective surfaces of the container, the containers are accumulated and mutual interfaces are adjacent and coupled for forming a network, at least one container among the plurality of accumulated containers is adjacent and couple with the coupling node of the long communication sheet, a central control device which has the same interface as the coupling node of the communication sheet is adjacent and coupled with the communication sheet and apart from the container of the communication sheet, and a signal is mutually transmitted between the central control device and the container for managing the container.

Further, according to the present invention, an information processing device using a tape-form communication sheet comprises coupling nodes, the coupling nodes, comprising:

a communication circuit unit comprising a power In/Out unit, a signal In/Out unit, a memory, a generator/rectifier, a signal reception/output unit, a charge/discharge battery, and CPU which is connected to the power In/Out unit, the signal In/Out unit, the generator/rectifier, the signal reception/output unit, and the charge/discharge battery through a selector; and an arrayed antenna connected to the generator/rectifier and the signal reception/output unit of the communication circuit unit, wherein the coupling nodes are fitted in a sheet body of the tape-form communication sheet and regularly lined in a plurality of rows, a signal transmission wiring and a power transmission wiring are fitted entirely along the sheet body in a longitudinal direction, the signal transmission wiring connects to the signal In/Out unit of the respective coupling nodes, and the power transmission wiring connects to the power In/Out unit of the respective coupling nodes, wherein a short communication sheet which is made by cutting the communication sheet in appropriate length is wound around a container for forming an interface on the respective surfaces of the container, the containers are accumulated and mutual interfaces are adjacent and coupled for forming a network, at least one container among the plurality of accumulated containers is adjacent and coupled with the coupling node of the communication sheet, a central control device and a power supply device which have the same interface as the coupling node of the communication sheet are adjacent and coupled with the communication sheet and apart from the container of the communication sheet, power is supplied from the power supply device to the interface of the container through the communication sheet, and signal is mutually transmitted between the central control device and the container for managing the container.

Further according to the present invention, an information processing device using a tape-form communication sheet comprises coupling nodes, the coupling nodes, comprising:

a communication circuit unit comprising a signal In/Out unit, a memory, a signal reception/output unit, and CPU which is connected to the signal In/Out unit, the memory, and the signal reception/output unit; and an arrayed antenna which is connected to the signal reception/output unit of the communication circuit unit, wherein the coupling nodes are fitted in a sheet body of the tape-form communication sheet and regularly lined in a plurality of rows, a signal transmission wiring is fitted entirely along the sheet body in a longitudinal direction, and the signal transmission wiring connects to the signal In/Out unit of the respective coupling nodes, wherein a short communication sheet which is made by cutting the tape-form communication sheet in appropriate length is wound around a muscle, a long communication sheet is adjacent and coupled with the coupling node of the short communication sheet, a central control device which has a same interface as the coupling node of the communication sheet is adjacent and coupled with the long communication sheet, and computation is conducted between the central control device and the respective coupling nodes of the short communication sheet for collecting myoelectric potential data of a muscle nerve bundle or a stimulation signal is sent to the muscle nerve bundle.

Further according to the present invention, an information processing device using a long tape-form communication sheet comprises coupling nodes, the coupling nodes, comprising:

a communication circuit unit comprising a power In/Out unit, a signal In/Out unit, a memory, a generator/rectifier, a signal reception/output unit, a charge/discharge battery, and CPU which is connected to the power In/Out unit, the signal In/Out unit, the generator/rectifier, the signal reception/output unit, and the charge/discharge battery through a selector; and an arrayed antenna connected to the generator/rectifier and the signal reception/output unit of the communication circuit unit, wherein the coupling nodes are fitted in a sheet body of the tape-form communication sheet and regularly lined in a plurality of rows, a signal transmission wiring and a power transmission wiring are fitted entirely along the sheet body in a longitudinal direction, the signal transmission wiring connects to the signal In/Out unit of the respective coupling nodes, and the power transmission wiring connects to the power In/Out unit of the respective coupling nodes, wherein a short communication sheet which is made by cutting the tape-form communication sheet in appropriate length is wound around a muscle, a long communication sheet is adjacent and coupled with the coupling node of the short communication sheet, a central control device and a power supply device which have the same interface as the coupling node of the communication sheet are adjacent and coupled with the communication sheet, power is supplied from the power supply device to the respective coupling nodes of the short communication sheet through the communication sheet, and computation is conducted between the central control device and the respective coupling nodes of the short communication sheet for collecting myoelectric potential data of a muscle nerve bundle or a stimulation signal is sent to the muscle nerve bundle.

Effect of the Invention

The present invention is suitable for transmitting a large volume of data and capable of connecting an electronic device to a transmission path easily without a connector.

BRIEF DESCRIPTION OF THE DRAWINGS

FIG. 12 is a schematic diagram of an application example of the present invention.

DESCRIPTION OF THE REFERENCE NUMERALS

2 Communication Sheet;
4 Sheet Body;
6 Protection Layer;
8 Protection Layer;
10 Coupling Node;
12 Cutoff Groove;
14 Conductive Layer;
16 Insulation Layer;
18 Communication Circuit Unit;
20 Power In/Out Unit;
22 Signal In/Out Unit;
24 Sheeted Battery;
26 Selector;
28 Memory;
30 CPU;
32 Generator/Rectifier;
34 Signal Reception/Output Unit;
36 Arrayed Antenna;
38 Signal Transmission Wiring;
40 Input Filter;
42 Output Filter;
44 Signal Input Amplifier;
46 Signal Output Amplifier;
48 Power Transmission Wiring;
50 Amplifier;
52 Amplifier;
54 Charge Circuit;
56 Discharge Circuit;
58 Controlled Device;
60 Communication Sheet;
62 Sheet Body;
64 External Interface;
66 Terminal;
68 Terminal;
70 Terminal;
72 Terminal;
74 Terminal;
76 Amplifier;
78 Amplifier;
80 Central Control Device;
82 Memory;
84 NIC;
85 NIC;
86 CPU;
88 Connector;
90 Power Supply Device;
92 Power Regulator;
94 Controlled Device;
96 Power Regulator;
98 NIC;
100 Memory;
102 CPU;
104 Case;
106 Container;
108 Router;
110 Container;
112 Target;
114 Circuit Unit;
115 Muscle; and
118 Nerve Bundle

THE BEST MODE FOR CARRYING OUT THE CLAIMED INVENTION

Hereinafter, exemplary embodiments of the present invention are described in reference of attached figures.

Figure 1:
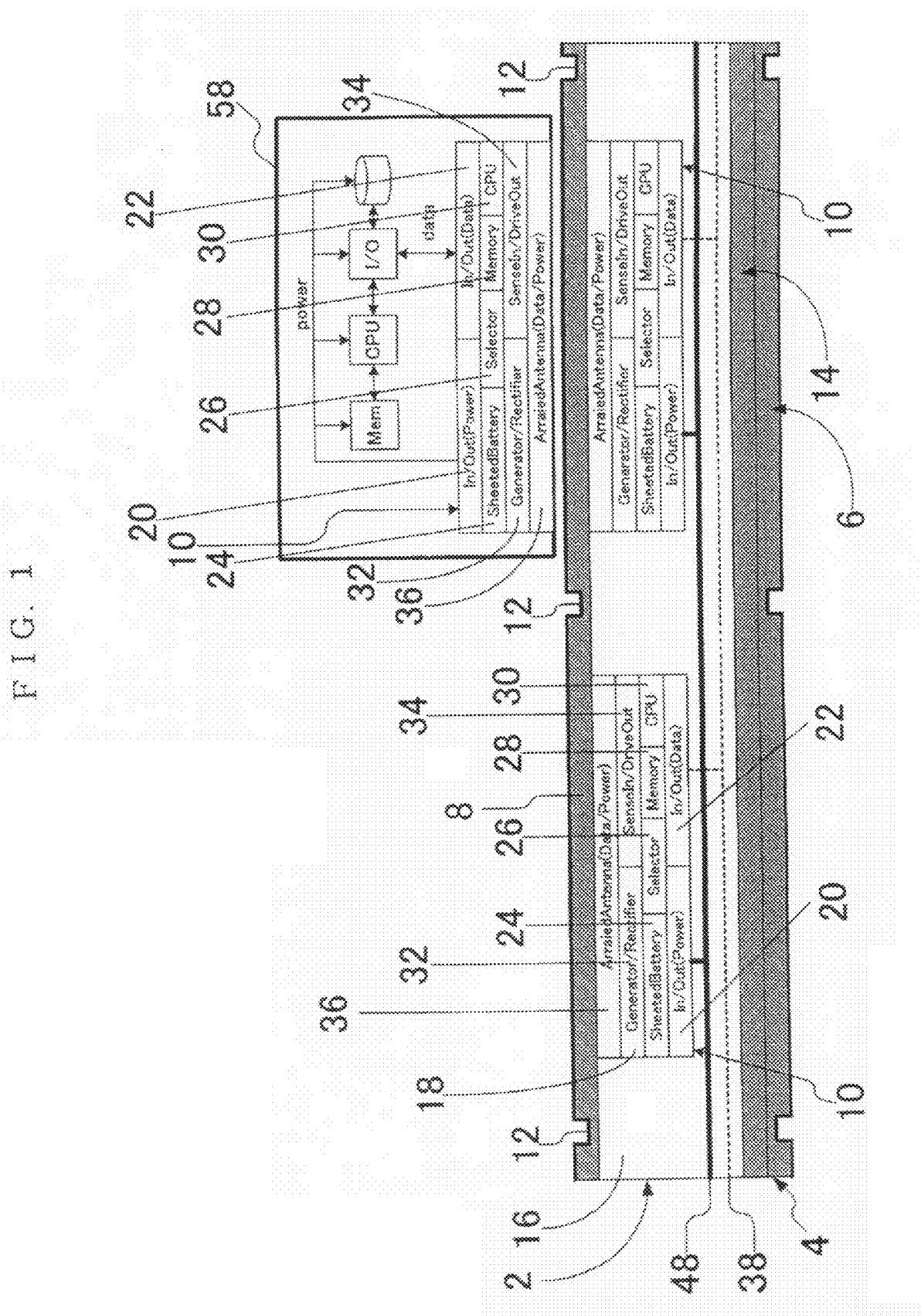
FIG. 1 is a schematic diagram of the present invention.

FIG. 1 is a schematic diagram of an information processing device using a tape-form communication sheet according to the present invention. Protection layers 6 and 8 are formed of elastic and insulative hard plastic which is transparent and flexible are provided on both surfaces of a long sheet body 4 extending in a longitudinal direction of a tape-form communication sheet 2. In these protection layers 6 and 8, a cutoff groove 12 being a guide for cutting the sheet body 4 is provided on the both sides of a coupling node 10 to be described later. A conductive material formed of conductive plastic is bonded to both sides of one of the both surfaces of the sheet body 4 and a conductive layer 14 is provided in contact with the protection layer 6. A plastic for substrate is bonded between the conductive layer 14 and the protection layer 8 on both sides of the other of both surfaces of the sheet body 4. An insulation layer 16 is provided between the conductive layer 14 and the production layer 8. In FIG. 1, in the insulation layer 16 extending in right and left directions, communication circuit units 18 are regularly lined every unit in a longitudinal direction with predetermined space and embedded in the insulation layer 16.

Figure 2:
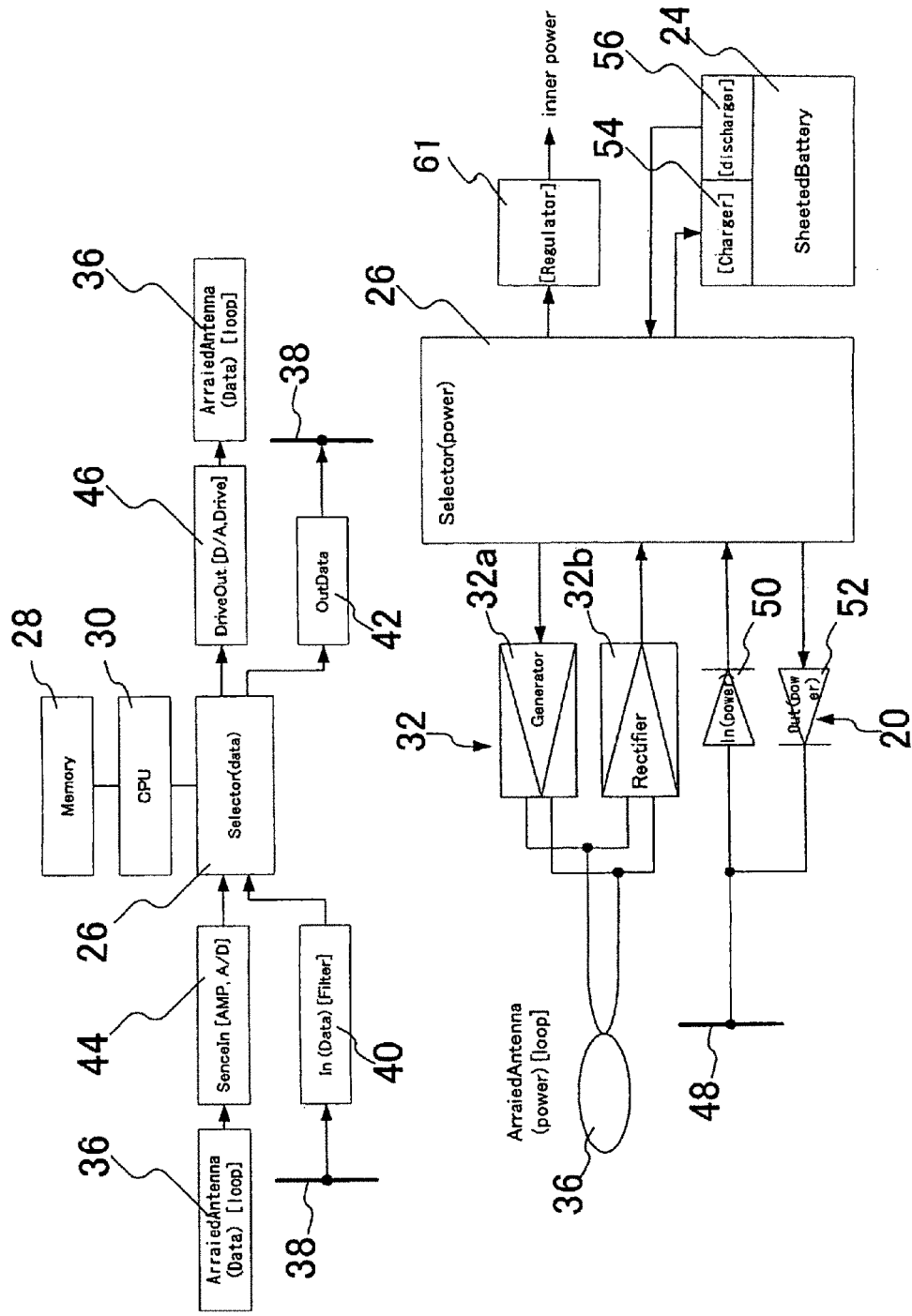
FIG. 2 is a function block diagram of the present invention.
Figure 3:
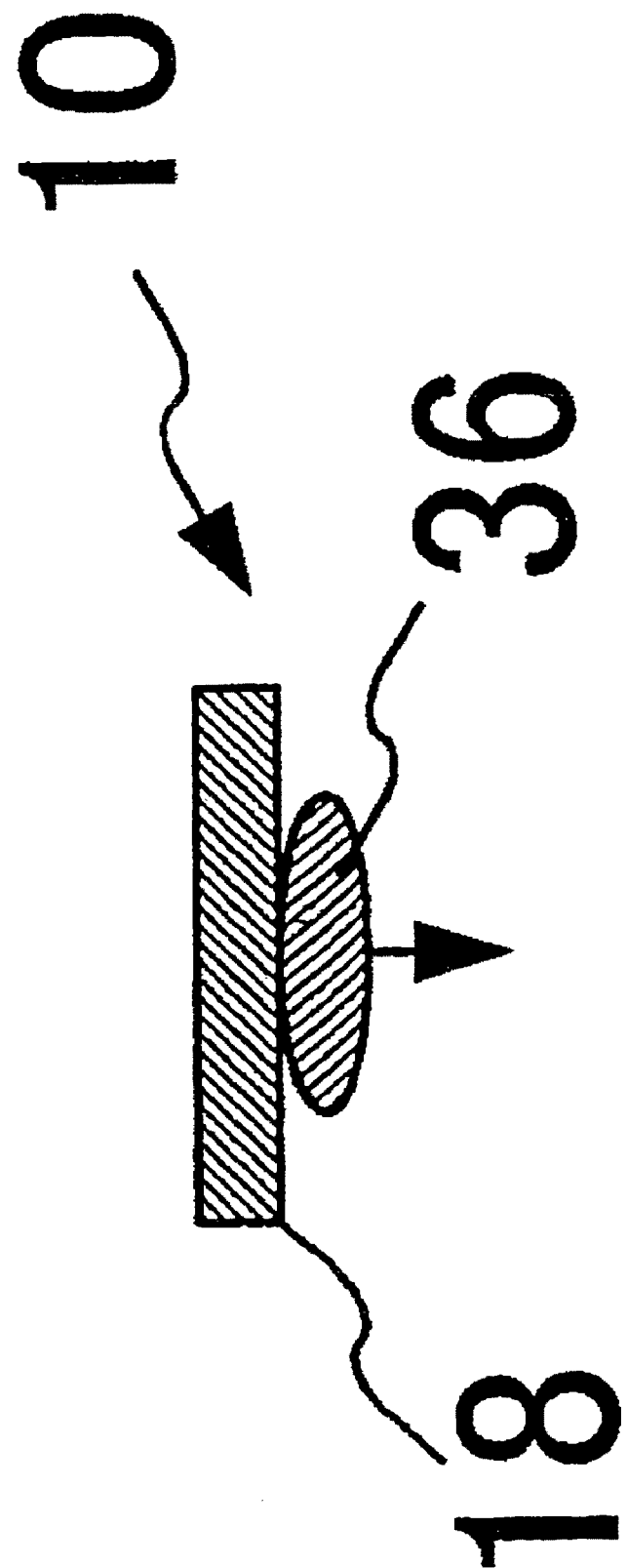
FIG. 3 is a schematic diagram of the present invention.

The communication circuit unit 18 is configured by a power In/Out unit 20, a signal In/Out unit 22, a sheeted battery 24, a selector 26 for power and signal, a memory 28, CPU 30 (central processing unit), a generator/rectifier 32, and a signal reception/output unit 34. This communication circuit unit 18 is configured by IC (integral circuit). An arrayed antenna 36 for transmitting and receiving data/power is connected to the communication circuit unit 18. In the sheet body 4 including the communication circuit unit 18, a region defined by the cutoff groove 12 forms a unit of coupling node 10. CPU 30 of the respective coupling nodes 10 has a unique ID and is capable of recognizing the respective coupling nodes 10. The coupling node 10 is configured by a signal system and a power system and connected in such manner shown in FIG. 2. In the signal system, a signal transmission wiring 38 penetrates the insulation layer 16 and is entirely embedded in the sheet body 4 in a longitudinal direction by a copper foil evaporation method. The signal transmission wiring 38 is connected to the signal In/Out unit 22 of the respective coupling nodes 10 through a branch line. The signal In/Out unit 22 is formed by an input filter 40 and an output filter 42. An end of the signal transmission wiring 38 is exposed in a cut end of the sheet body 4 and the exposed portion forms an input/output end. The signal reception/output unit 34 is configured by a signal input amplifier 44 for A/D conversion and a signal output amplifier 46 for D/A conversion, and they are respectively connected to the signal selector 26 and the arrayed antenna 36. In the power system, a power transmission wiring 48 penetrates the insulation layer 16 and is entirely embedded in the sheet body 4 in a longitudinal direction by a copper foil evaporation method. The power transmission wiring 48 is connected to a power input amplifier 50 and a power output amplifier 52 forming a power In/Out unit 20 of the respective coupling nodes 10 through a branch line. The amplifiers 50 and 52 are connected to the power selector 26. The arrayed antenna 36 for power is respectively connected to the generator/rectifier 32 formed by a generator 32a and a rectifier 32b, and the generator/rectifier 32 is connected to the power selector 26. The sheeted battery 24 is connected to the power selector 26 through a charge circuit 54 and a discharge circuit 56.

Next, an operation of the tape-form communication sheet is described.

FIG. 1 shows a state where a coupling node 10 in the tape-form communication sheet 2 is adjacent to a coupling node 10 of a controlled device 58 such as iPod of a trade name including the coupling node 10, and they are electromagnetically coupled or electric field coupled, or electromagnetic-wave coupled or ultrasonically coupled, with each other through the arrayed antennas 36 and 36. Through this coupling, power and signal are supplied from the tape-form communication sheet 2 to the controlled device 58. Although a case of the arrayed antenna for electromagnetic wave is described in this embodiment, the arrayed antenna 36 is not limited to the electromagnetic wave. An arrayed antenna may be for electrolytic signal, magnetic field signal, or ultrasonic sound. Interface of the controlled device 58 is formed by a coupling node 10 with the tape-form communication sheet cut by the cutoff groove 12. The power In/Out unit 20 and the signal In/Out unit of the coupling node 10 fitted in the controlled device 58 are connected to a computer in the controlled device 58.

In the above-described configuration, the power supplied from the power transmission wiring 48 to the communication sheet 2 is supplied to the sheeted battery 24 through the power In/Out unit 20 and charges the battery 24. The generator 32a is driven by power supplied from the power In/Out unit 20 and the power energy is generated from the generator 32a. This power energy is transmitted to the power arrayed antenna 36 of the controlled device 58 through the power arrayed antenna 36. The power high-frequency wave transmitted by the arrayed antenna 36 is rectified by the rectifier 32 on a side of the controlled device 58. This rectified power energy is distributed into the sheeted battery 24 and an interior power stable circuit 61 by the selector 26. A signal (data) supplied to the signal transmission wiring 38 of the tape-form communication sheet 2 is inputted to CPU 30 through the signal In/Out unit 22 of the communication sheet 2. The signal inputted to CPU 30 is processed here. The processed signal is supplied to the output amplifier 46. The output amplifier 46 D/A converts the inputted signal to the antenna signal and the signal is supplied to the signal arrayed antenna 36. The signal is transmitted to the arrayed antenna 36 of the coupling node 10 on the side of the controlled device 58 through the arrayed antenna 36 and inputted into CPU 30 of the coupling node 10 of the controlled device 58 through the amplifier 44 of the signal input unit 22.

Figure 4:
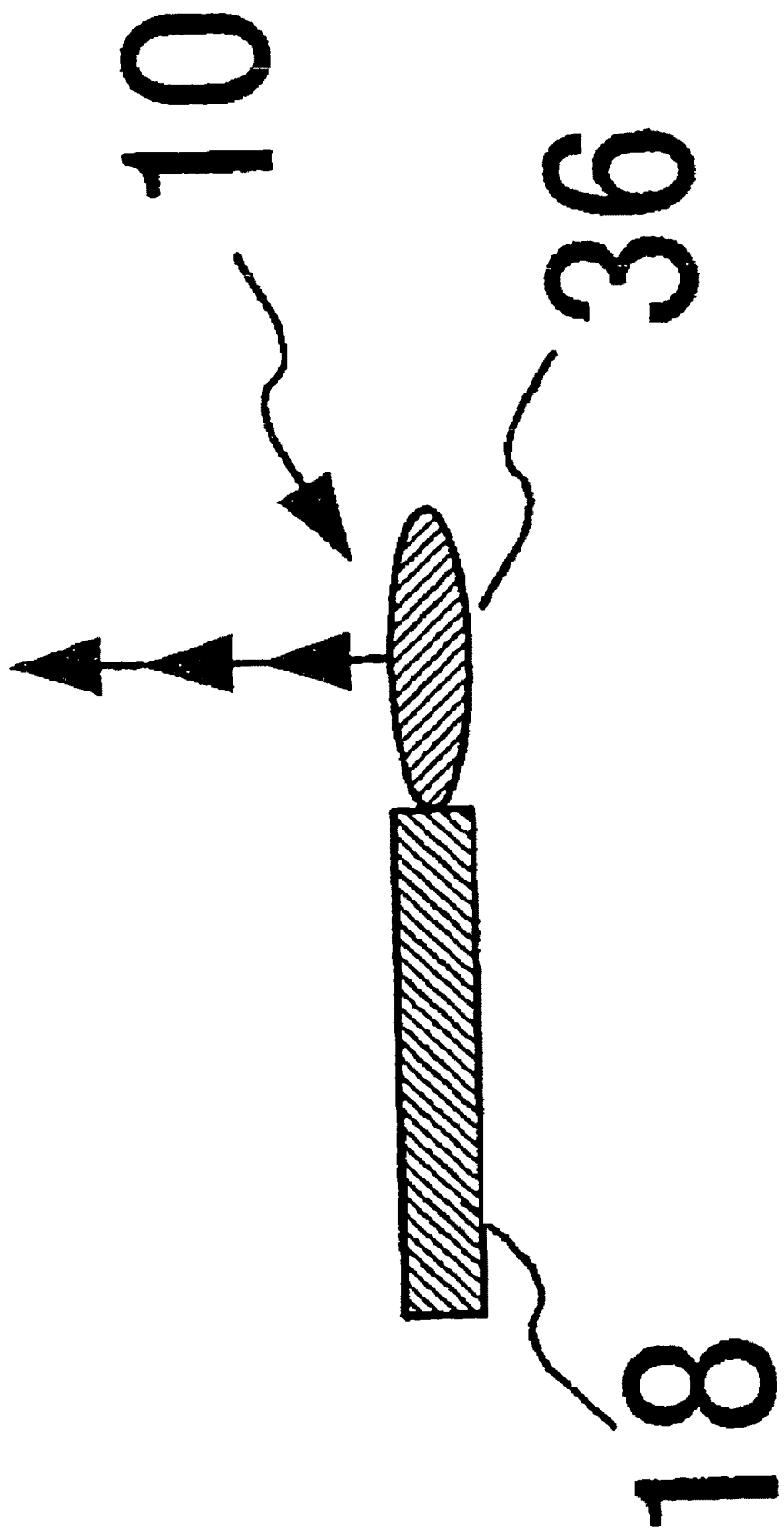
FIG. 4 is a schematic diagram of the present invention.
Figure 10:
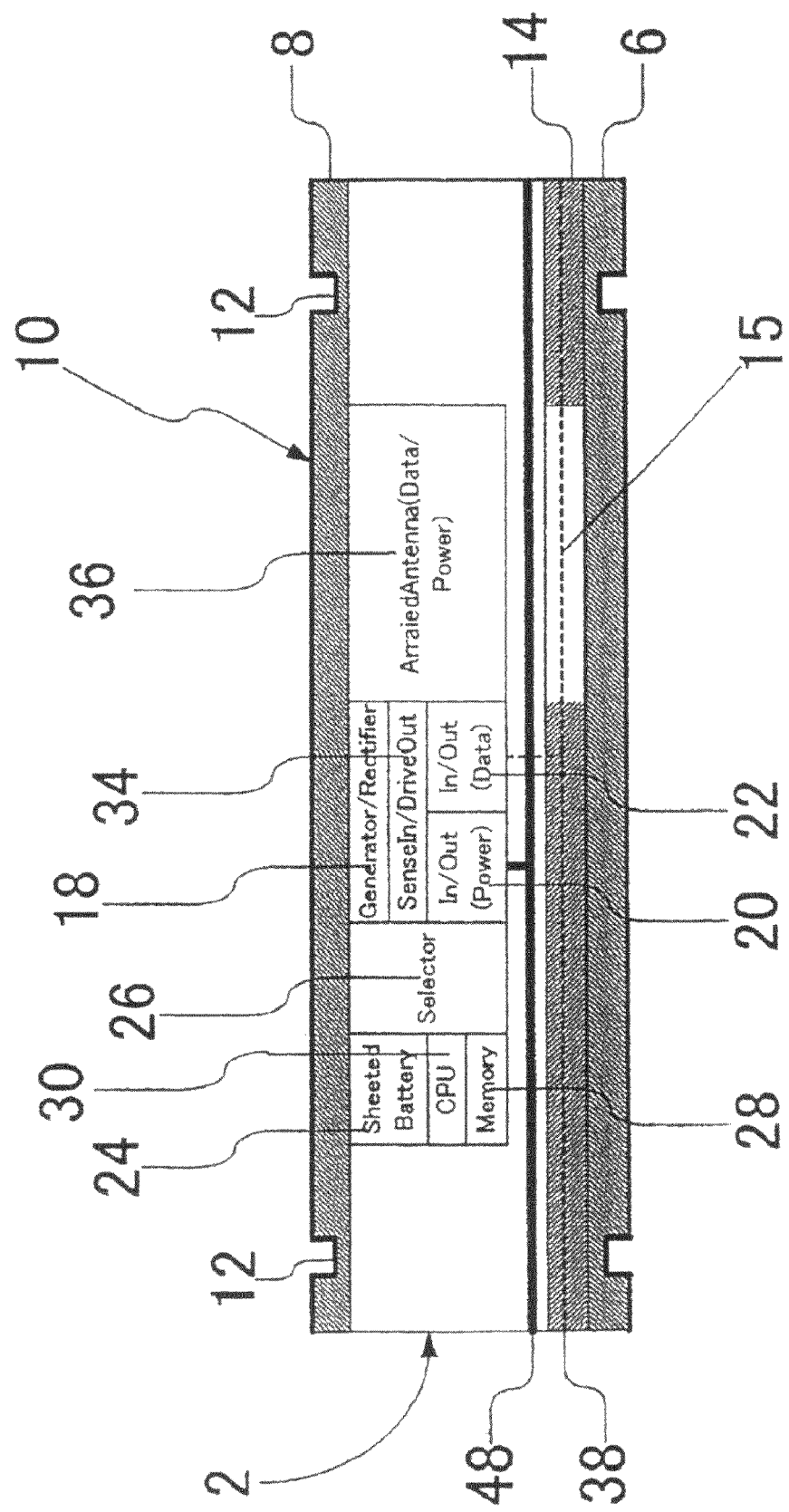
FIG. 10 is a schematic diagram of an application example of the present invention.

With respect to the above-described tape-form communication sheet 2, there is a double-sided type as well as a single-sided type shown in FIG. 1. In this tape-form communication sheet 2 of the double-sided type, the communication circuit unit 18 is fitted in both surfaces of the sheet body 4, and the arrayed antenna 36 is arranged on the both surfaces. This tape-form communication sheet of the double-sided type is not shown in the figure. With respect to the coupling node 10, there is an opposite surface arrangement type (hereinafter referred to as "A type") and a V type. In the A type of opposite surface arrangement, the arrayed antenna 36 is located in a lower side of the communication circuit 18. In the V type, the arrayed antenna 36 is located on the side of the communication circuit 18 as shown in FIG. 4. The A type of opposite surface arrangement is suitable for coupling by approximating two coupling nodes with each other. The V type is suitable for coupling by accumulating coupling nodes in vertical direction. FIG. 10 shows the communication sheet 2 having a V-type coupling node 10. In this communication sheet 2, an opening 15 is formed in the conductive layer 14 immediately beneath the arrayed antenna 36 so that the conductive layer does not obstruct transmittance and reception of the signal of the arrayed antenna 36. The other configuration is same as the communication sheet 2 shown in FIG. 1.

As shown above, the controlled device 58 such as iPod fitting with an interface (coupling node) similar to the coupling node 10 of the tape-form communication sheet 2 or a computer having the above-described interface is approximated with the tape-form communication sheet 2 and thereby they are capable of mutually transmitting signals and power.

Figure 5:
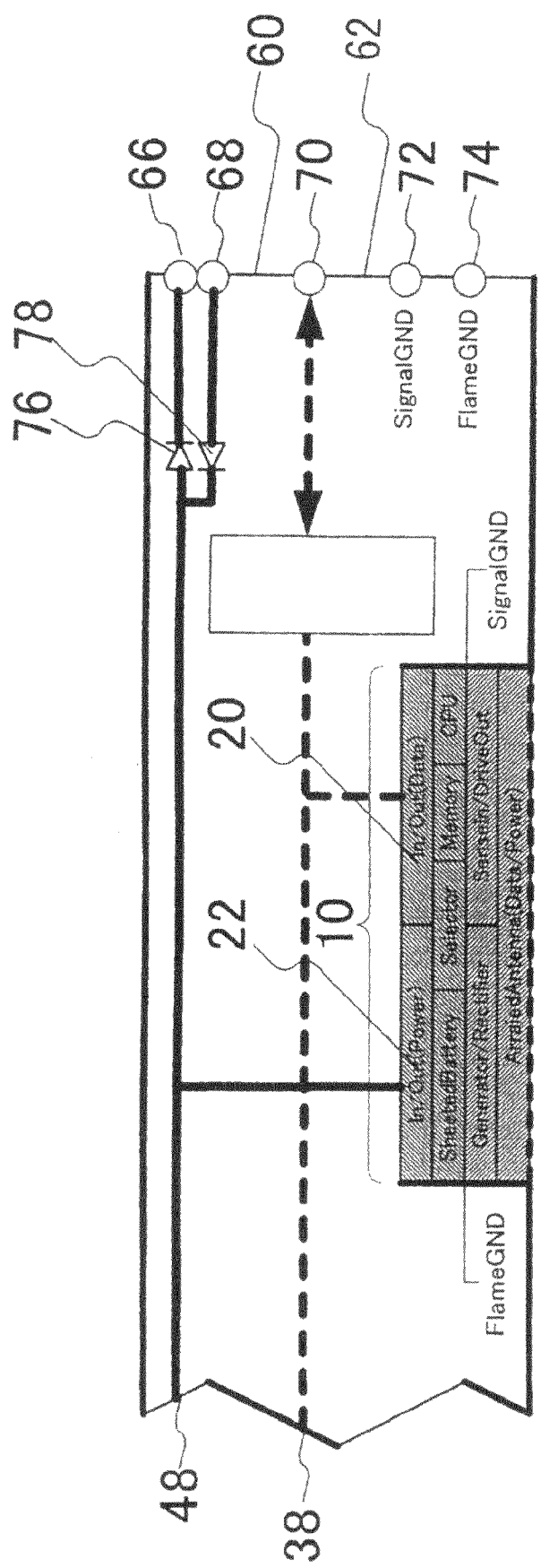
FIG. 5 is a schematic diagram of an application example of the present invention.

FIG. 5 shows a tape-form communication sheet 60 with external interface. An external interface circuit 64 corresponding to NIC, RS232C, USB and the like is fitted in a sheet body 62. An internal multiple structure of the sheet body 62 of the communication sheet 60 shown in FIG. 5 is same as the structure of the sheet body 4 shown in FIG. 1. A power output terminal 66, a power input terminal 68, a signal input/output terminal 70, a signal ground terminal 72, and a frame ground terminal 74 are provided at the end of the sheet body 62. An external interface circuit 64 is connected to the signal input/output terminal 70 through a lead wire. Two types of coupling nodes 10, A type and V type, are fitted in the sheet body 60 every unit. Only a unit of coupling nodes 10 is shown in FIG. 5 but other coupling nodes are not shown. A power transmission wiring 48 and a signal transmission wiring 38 are fitted in the sheet body 60. The power transmission wiring 48 is connected to the power In/Out unit 22 of the respective coupling nodes 10 and connected to the power input terminal 68 and the output terminal 66 through amplifiers 76 and 78. The signal transmission wiring 48 is connected to the signal In/Out unit 20 of the respective coupling nodes 10 and connected to the interface circuit 64.

Next, an application example of tape-form communication sheet 60 with above-described interface is described.

Figure 6:
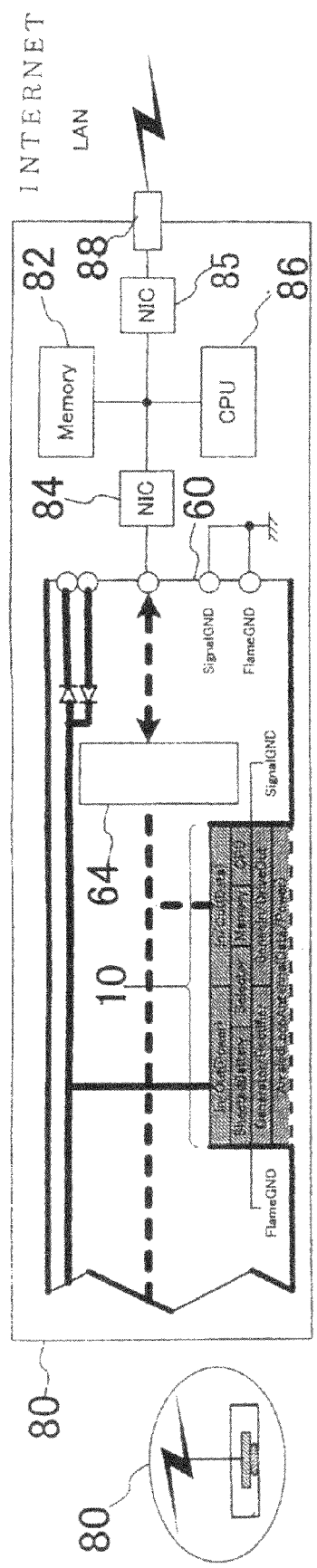
FIG. 6 is a schematic diagram of an application example of the present invention.
Figure 7:
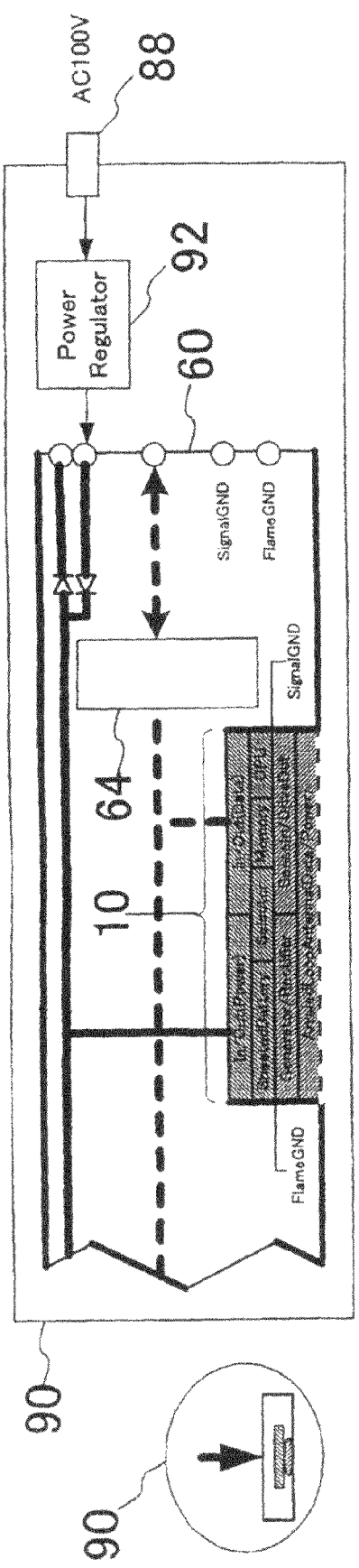
FIG. 7 is a schematic diagram of an application example of the present invention.

FIG. 6 shows an application example where the tape-form communication sheet 60 with cut-off interface is fitted in a central control device 80. The central control device 80 is configured by a computer including a memory 82, NICs (Network Interface Card) 84 and 86, CPU 86, and a connector 88. The central control device 80 is connectable to an internet and LAN. FIG. 7 shows an application example where the tape-form communication sheet 60 with interface fitted in a power supply device 90. The power supply device 90 includes a power regulator 92 and is connectable to an external power supply of AC100V through the connector 88.

Figure 8:
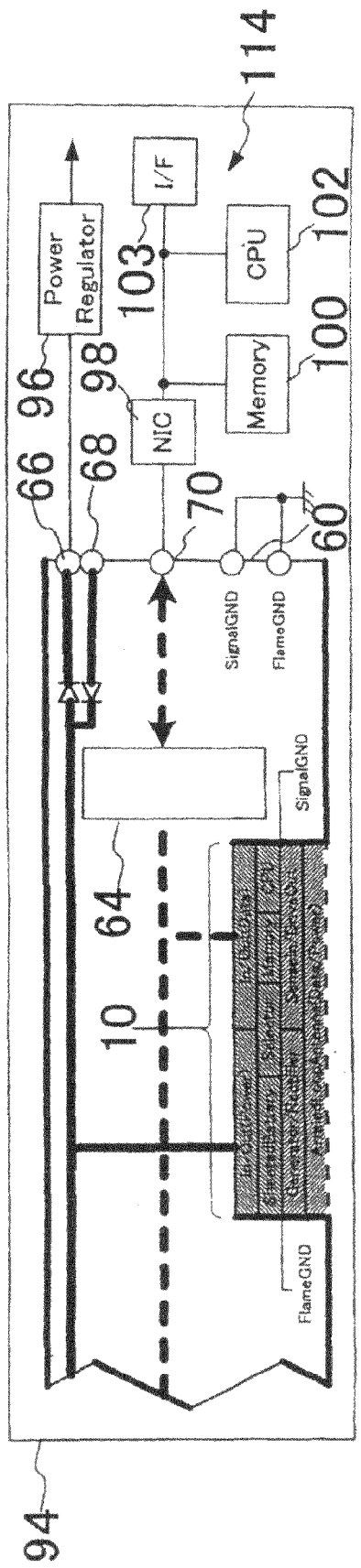
FIG. 8 is a schematic diagram of an application example of the present invention.
Figure 9:
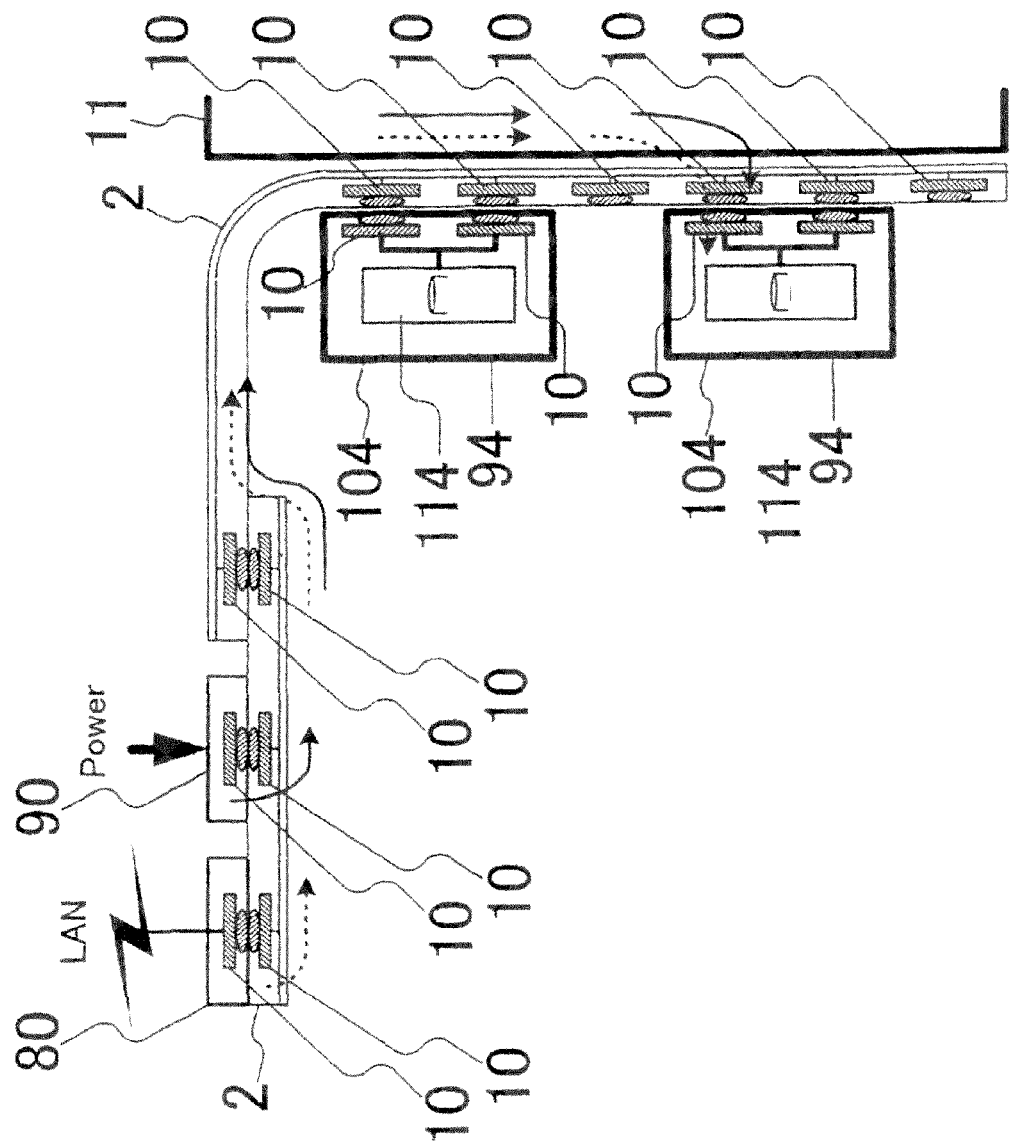
FIG. 9 is a schematic diagram of an application example of the present invention.

FIG. 8, for example, shows an application example where the tape-form communication sheet 60 with interface is fitted in a controlled device 94 such as a trade name of iPod manufactured by the U.S. Apple Inc. The controlled device 94 includes a circuit unit 114 formed of a power regulator 96, NIC 98, a memory 100 such as a hard disk, CPU 102, and interface 103. The power regulator 96 connects to the power output terminals 66 and 68 of the sheet body 60; and power is supplied from here to an in-case circuit unit of the controlled device 94. NIC 98 connects to the signal In/Out unit 70 of the sheet body 60. Next, an application example of an information processing device using a tape-form communication sheet utilizing a wall surface of a building is described.

Two tape-form communication sheets 2 and 2 are attached to a wall surface 11 and the central control device 80 and the power supply device 90 are connected to this. In this connection, the arrayed antenna on the side of the devices 80 and 90 faces the arrayed antenna on the side of the tape-form communication sheet 2, and the tape-form communication sheet 2 is connected to the devices 80 and 90 face to face. With respect to the tape-form communication sheets 2 and 2, respective arrayed antennas face each other and are attached to each other, and the sheets 2 and 2 are connected to each other. With respect to a target such as iPod of trade name, or the controlled devices 94 and 94, the tape-form communication sheet 60 having two units of coupling nodes 10 is fitted in a case 104 thereof and connected to the circuit unit 114 such as main CPU, HD fitted in this case 104. The above-described tape-form communication sheet 60 is bonded to a transparent cover of the case 104. An arrangement space between coupling nodes 10 and 10 of the communication sheet 60 in the case 104 is set up same as that between a pair of coupling nodes 10 and 10 on the side of the tape-form communication sheet 2. For this reason, it is configured in such manner that when an interface cover surface of the case 104 of the target 94 directly contacts to a coupling node arranged surface of the tape-form communication sheet 2, the coupling nodes 10 and 10 on the side of the target 94 are adjacent to the coupling nodes 10 and 10 on the side of the tape-form communication sheet 2 through the arrayed antenna 36.

In the above-described configuration, when the targets 94 and 94 contact with the tape-form communication sheet 2, digital content such as music is supplied from the central control device 80 connecting to LAN to the targets 94 and 94 through the tape-form communication sheets 2 and 2. Power is also supplied from the power supply device 90 to the targets 94 and 94 through the tape-form communication sheets 2 and 2.

Figure 11:
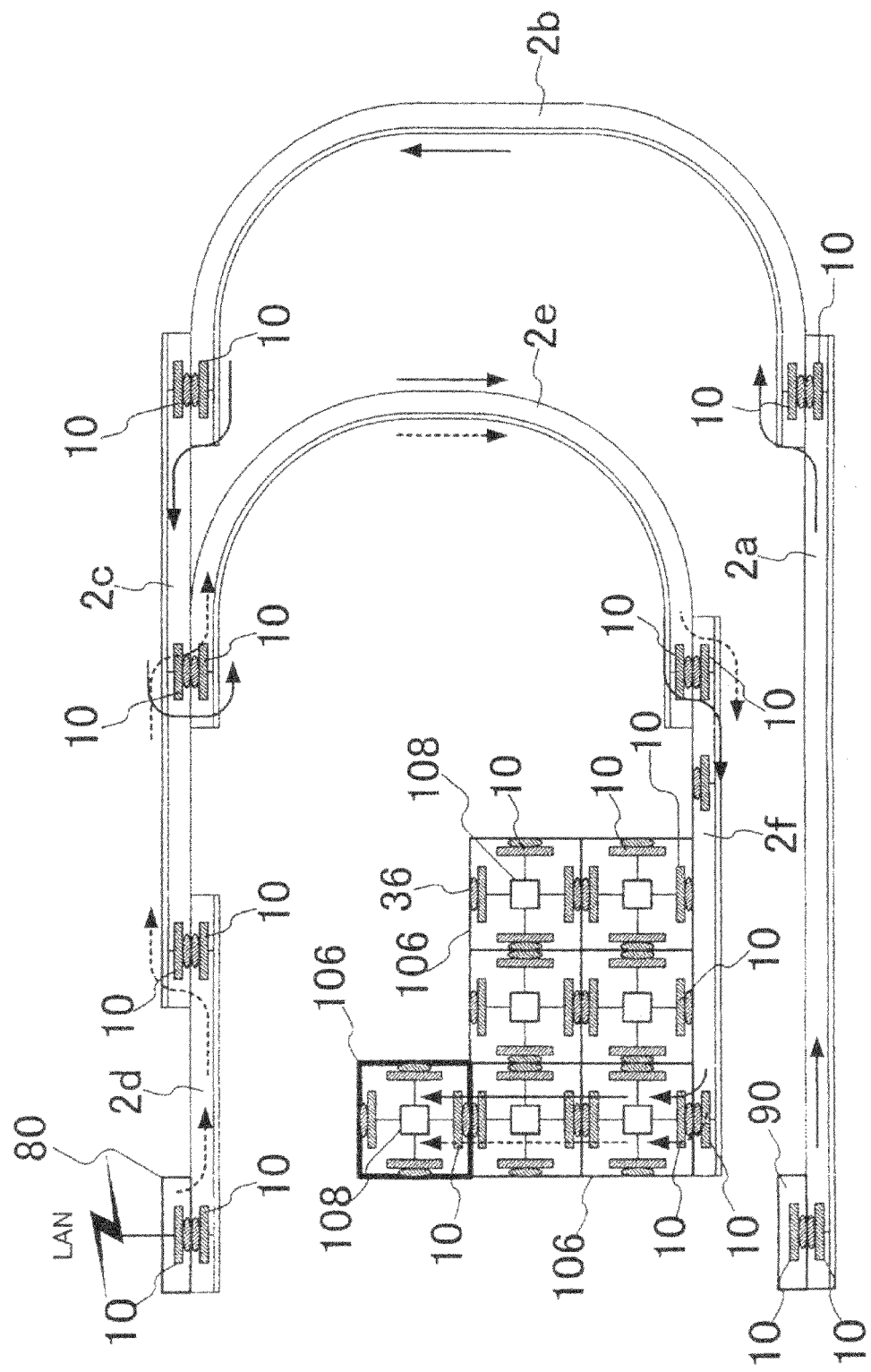
FIG. 11 is a schematic diagram of an application example of the present invention.

Next, with reference to FIG. 11, an application example of the information processing device which sends a control signal and power to multiple containers loaded on a deck of a cargo ship is described.

A coupling node 10 is arranged on the respective surfaces of the container to be used, and the respective coupling nodes 10 are connected to the container through a router 108. The router 108 relays and transmits data and power between the coupling nodes 10. The containers 106 loaded on the deck or the like are connected through an arrayed antenna 36 of the coupling node 10 due to mutual contact between wall surfaces. Inside the ship, plural tape-form communication sheets 2 which are cut in predetermined length at the boundary of the coupling node 10 are extended around. The coupling nodes are overlapped with each other and the respective tape-form communication sheets 2 are connected with bond. Signs 2a, 2b, 2c, 2d, 2e, and 2f are put on the communication sheet 2 for distinguishing six pieces of communication sheets 2. The power supply device 90 is arranged on the tape-form communication sheet 2a in contact therewith and one of the containers 106 at the bottom is connected to a single tape-form communication sheet 2f through a coupling node 10 with contact.

The central control device 80 is arranged in contact to the tape-form communication sheet 2d. A control signal inputted in the central control device 80 is sent to the communication sheet 2d through the coupling node 10 of the central control device 80 via LAN. Further, it is inputted in the coupling node 10 at the bottom through the connected tape-form communication sheets 2c, 2e, and 2f. The control signal thus inputted in the coupling node 10 of the container 106 at the bottom is relayed by the router 108 inside the container 106, and supplied to a desired coupling node 10 of the target container 106. Meanwhile, the power energy supplied from the power supply device 90 is supplied to the coupling node 10 of the container 106 through the tape-form communication sheets 2a, 2b, 2c, 2e, and 2f. The power energy is further relayed by the router 108 inside the container 106 and supplied to the desired coupling node 10 of the target container 106. These information processes are conducted based on a container management program which is stored in the central control device 80 or downloaded in a memory of the central control device 80 via LAN.

Next, a method of coupling mutual data of multiple containers is described with reference to FIG. 12.

The tape-form communication sheet 2 is respectively wound around respective containers 110 multiply loaded by appropriate means for preventing the tapes from falling off. The respective loaded containers 110 are coupled with each other by means of electromagnet, electric field, electromagnetic wave, or ultrasonic wave through the coupling node 10 of the tape-form communication sheet 2. The containers 110 and 110 at the bottom are placed on the tape-form communication sheet 2 arranged on the floor surface. In the respective containers 110, the tape-form communication sheets 2 contact with each other and the coupling nodes are adjacent to each other, and therefore data and power are mutually transmitted between coupling nodes. Transmission of these data and power is conducted by control of the central control device coupled to the communication sheet 2.

The tape-form communication sheet 2 relays data and power and transmits data power to the tape-form communication sheet 2 of the containers 110 and 110 at the bottom. In multiple containers 110, data and location data therein are processed by the central control device through the coupling node 10 of the tape-form communication sheet 2 wound around the containers.

Figure 13:
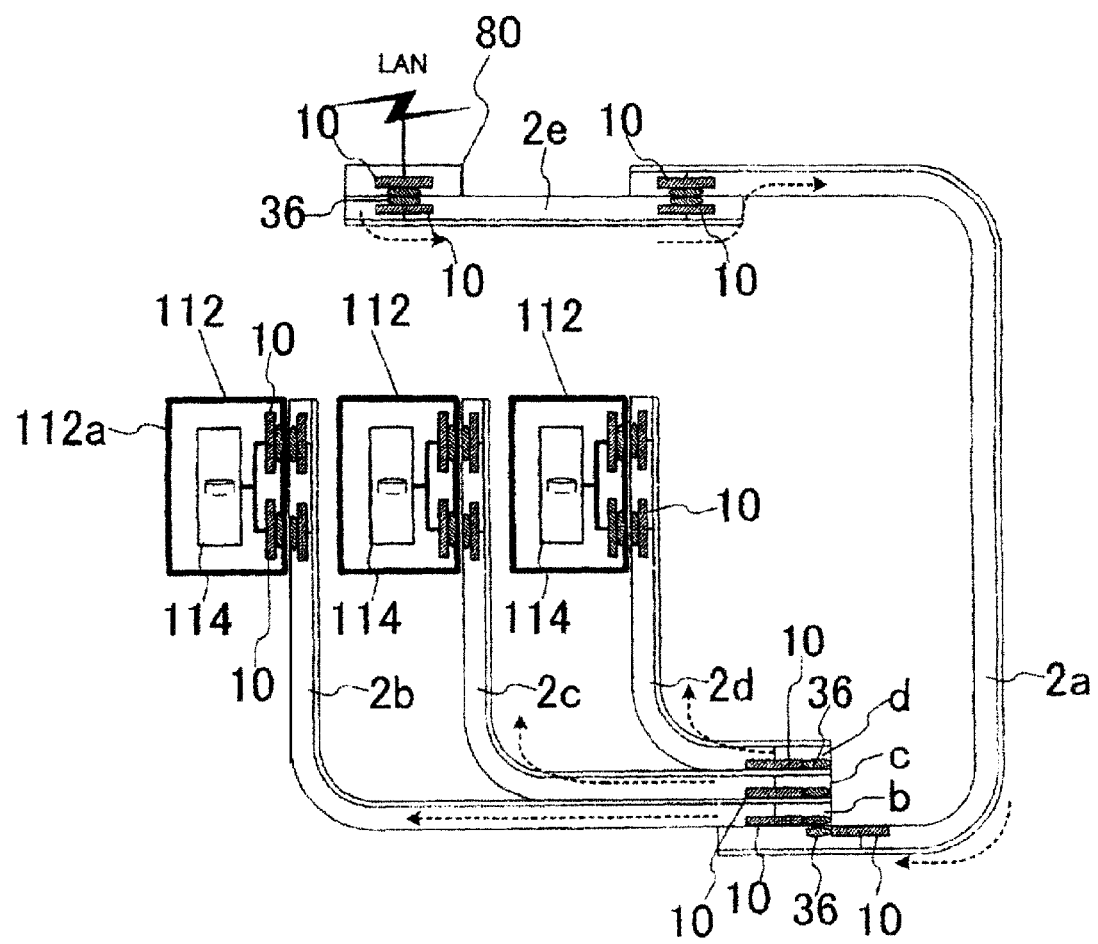
FIG. 13 is a schematic diagram of an application example of the present invention.

Next, an embodiment of the information processing device where plural tape-form communication sheets are overlapped and coupled for distributing signals to respective tape-form communication sheets is described with reference to FIG. 13.

Respective end portions b, c, and d of the tape-form communication sheets 2b, 2c, and 2d have a V-type coupling node 10, and theses end portions b, c, and d are overlapped and arranged in contact. An A-type coupling node 10 of a target (controlled device) 112 which is formed of a file server, RAID, and the like is adjacent to an A-type coupling node 10 of the respective tape-form communication sheets 2b, 2c, and 2d. In the target 112, a circuit unit 114 including a main CPU, HD, and the like is fitted in a case 112a, and the A-type coupling nodes 10 and 10 are connected to this The coupling nodes 10 and 10 are bonded and arranged to a transparent cover of the case 112a. A V-type coupling node 10 is fitted in end portion of the tape-form communication sheets 2b, 2c, and 2d. The respective end portions of the tape-form communication sheets 2b, 2c, 2d, and 2a are overlapped in an accumulation direction and respective arrayed antennas 36 of the respective V-type coupling nodes 10 are overlapped in a vertical direction. In tape-form communication sheets 2a and 2e, the A-type coupling nodes 10 are coupled with each other through the arrayed antenna 36. In the A-type coupling node 10 of the tape-form communication sheet 2e, a control signal inputted by the central control device 80 via LAN is transmitted to the tape-form communication sheets 2e and 2a. The control signal transmitted to the tape-form communication sheet 2a is propagated from the V-type coupling node 10 to respective V-type coupling nodes 10 of the tape-form communication sheets 2b, 2c, and 2d in a vertical direction through the arrayed antenna 36. Here the control signal is distributed to the tape-form communication sheets 2b, 2c, and 2d. The control signals thus distributed to the tape-form communication sheets 2b, 2c, and 2d are transmitted to the A-type coupling nodes 10 of the targets 112, 112, and 112 in contact with the respective communication sheets 2b, 2c, and 2d through the A-type coupling nodes 10 of the respective communication sheets 2b, 2c, and 2d.

Figure 14:
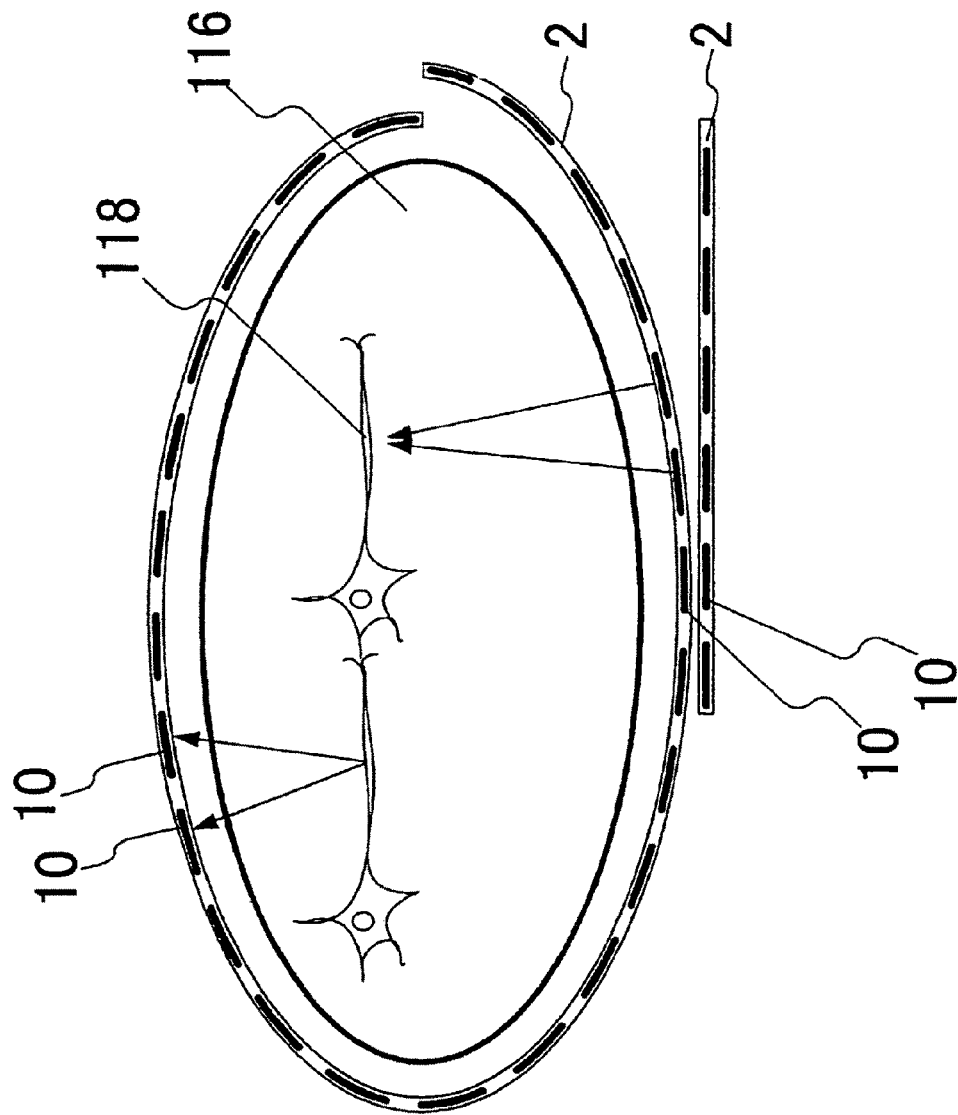
FIG. 14 is a schematic diagram of an application example of the present invention.

Next, a method of coupling myoelectric potential data by a tape-form communication sheet wound around muscle is described with reference to FIG. 14.

A tape-form communication sheet 2 is wound around muscle 116. A coupling node of the tape-form communication sheet 2 relaying data and power is adjacent to the communication sheet 2. Myoelectric potential data and power are mutually transmitted between the tape-form communication sheets 2 and 2. An electric signal passing through a nerve bundle 118 in the muscle 116 as myoelectric potential data is detected as a magnetic field signal by the arrayed antenna of the plural coupling nodes 10 of the tape-form communication sheet 2. The respective coupling nodes 10 of the tape-form communication sheet 2 wound around the muscle 116 calculate received data with each other and approximate them to true myoelectric potential data. Further, the plural coupling nodes of the tape-form communication sheet 2 adjacent to the nerve bundle 118 compute received data and cooperate with each other, and a signal for aggravating a stimulation signal to a target nerve of the nerve bundle 118 is generated from the plural coupling node. Therefore it is possible to control the muscle movement.

What is claimed is:

1. A tape-form communication sheet, comprising:
    a sheet body of a tape form;
    coupling nodes which are fitted in the sheet body and are regularly lined in a plurality of rows; and
    a signal transmission wiring, wherein a computer having an interface similar to the coupling node or a device fitted with computer is adjacent to the coupling nodes for transmitting a signal, the coupling nodes, comprising:
    a communication circuit unit comprising a signal In/Out unit, a memory, a signal reception/output unit, and CPU that is connected to the signal In/Out unit, the memory, and the signal reception/output unit; and
    an arrayed antenna which are connected to the signal reception/output unit of the communication circuit unit and arranged in face to at least one surface of the sheet body, wherein the signal transmission wiring is connected to the signal In/Out unit of the respective coupling nodes.

2. The tape-form communication sheet according to claim 1,
    wherein the sheet body is a multiple structure comprising a protection layer which is formed of transparent plastic material and arranged on both surfaces of the sheet body; a conductive layer which is formed of conductive plastic and arranged between the protection layers of the both surfaces; an insulation layer which is formed of an insulative plastic material, adjacent to the conductive layer in a direction of accumulation, and arranged between the protection layers of the both surfaces, and the coupling node is fitted in the insulation layer.

3. The tape-form communication sheet according to claim 1,
    wherein the arrayed antenna has functions of sending and receiving electromagnetic wave, magnetic field signal, electric field signal, or ultrasonic wave, and the signal reception/output unit connected to the arrayed antenna corresponds to these functions.

4. The tape-form communication sheet according to claim 1,
    wherein an external interface circuit is fitted in the sheet body and the external interface circuit is connected to the signal transmission wiring.

5. The tape-form communication sheet according to claim 1,
    wherein, in the coupling node, the arrayed antenna is adjacent to the communication circuit unit in a thickness direction of the sheet body.

6. The tape-form communication sheet according to claim 1,
    wherein the sheet body includes a coupling node which is configured by the arrayed antenna adjacent to a side of the communication circuit unit.

7. A tape-form communication sheet, comprises:
    a sheet body of a tape form;
    coupling nodes which are fitted in the sheet body and regularly lined in a plurality of rows; a signal transmission wiring; and
    a power transmission wiring which is entirely fitted along the sheet body in a longitudinal direction, wherein a computer having an interface similar to the coupling node or a device fitted with the computer is adjacent to the coupling nodes for transmitting a signal and transmitting power, the coupling nodes, comprising:
    a communication circuit unit comprising a power In/Out unit, a signal In/Out unit, a memory, a generator/rectifier, a signal reception/output unit, a charge/discharge battery, and CPU connected to the power In/Out unit, the signal In/Out unit, the generator/rectifier, the signal reception/output unit, and the charge/discharge battery through a selector; and
    an arrayed antenna which is connected to the generator/rectifier, and the signal reception/output unit of the communication circuit unit and arranged in face to at least one surface of the sheet body, wherein the signal transmission wiring is connected to the signal In/Out unit of the respective coupling nodes, and the power transmission wiring is connected to the power In/Out unit of the respective coupling nodes.

8. The tape-form communication sheet according to claim 7,
    wherein the arrayed antenna has functions of sending and receiving electromagnetic wave, magnetic field signal, electric field signal, or ultrasonic wave, and the generator/rectifier and the signal reception/output unit correspond to these functions.

9. The tape-form communication sheet according to claim 7,
    wherein an external interface circuit is fitted in the sheet body and the external interface circuit is connected to the signal transmission wiring.

10. The tape-form communication sheet according to claim 7,
    wherein the sheet body is a multiple structure comprising a protection layer which is formed of transparent plastic material and arranged on both surfaces of the sheet body; a conductive layer which is formed of conductive plastic and arranged between the protection layers of the both surfaces; an insulation layer which is formed of an insulative plastic material, adjacent to the conductive layer in a direction of accumulation, and arranged between the protection layers of the both surfaces, and the coupling node is fitted in the insulation layer.

11. The tape-form communication sheet according to claim 7,
    wherein, in the coupling node, the arrayed antenna is adjacent to the communication circuit unit in a thickness direction of the sheet body.

12. The tape-form communication sheet according to claim 7,
    wherein the sheet body includes a coupling node which is configured by the arrayed antenna adjacent to a side of the communication circuit unit.

13. An information processing device using a tape-form communication sheet which comprises coupling nodes, the coupling nodes, comprising:
    a communication circuit unit comprising a signal In/Out unit, a memory, a signal reception/output unit, and CPU connected to the signal In/Out unit and the signal reception/output unit; and an arrayed antenna which are connected to the signal reception/output unit of the communication circuit unit, wherein the coupling nodes are fitted in a sheet body of the tape-form communication sheet and regularly lined in a plurality of rows, a signal transmission wiring is fitted entirely along the sheet body in a longitudinal direction, the signal transmission wiring connects to the signal In/Out unit of the respective coupling nodes, and the respective coupling nodes form a network, wherein the communication sheet is attached to a wall surface of a building, a central control device and a power supply device which have the same interface as the coupling node of the communication sheet are adjacent and connected to the coupling node of the communication sheet, a controlled device having the same interface as the coupling node of the communication sheet is adjacent to an portion of the wall surface attached with the communication sheet, and a variety of digital contents are transmitted from the central control device to the controlled device through the communication sheet.

14. The information processing device according to claim 13,
wherein the controlled device is made to be a music player having the interface of the same configuration as the coupling node, and music digital content is transmitted from the central control device to a hard disk of the music player through the communication sheet.

15. The tape-form communication sheet according to claim 14,
wherein an power input/output terminal and an external interface terminal are provided in an end portion of the sheet body, the power, transmission wiring is connected to the power input/output terminal, and the external interface circuit is connected to the external interface terminal.

16. An information processing device using a tape-form communication sheet which comprises coupling nodes, the coupling nodes, comprising:
a communication circuit unit comprising a power In/Out unit, a signal In/Out unit, a memory, a generator/rectifier, a signal reception/output unit, a charge/discharge battery, and CPU which is connected to the power In/Out unit, the signal In/Out unit, the generator/rectifier, the signal reception/output unit, and the charge/discharge battery through a selector; and
an arrayed antenna connected to the generator/rectifier and the signal reception/output unit of the communication circuit unit, wherein the coupling nodes are fitted in a sheet body of the tape-form communication sheet and regularly lined in a plurality of rows, a signal transmission wiring and a power transmission wiring are fitted entirely along the sheet body in a longitudinal direction, the signal transmission wiring connects to the signal In/Out unit of the respective coupling nodes, and the power transmission wiring connects to the power In/Out unit of the respective coupling nodes, wherein the communication sheet is attached to a wall surface of a building, a central control device and a power supply device which have the same interface as the coupling node of the communication sheet are adjacent and connected to the coupling node of the communication sheet, a controlled device having the same interface as the coupling node of the communication sheet is adjacent to a portion of the wall surface attached with the communication sheet, a variety of digital contents are transmitted from the central control device to the controlled device through the communication sheet, and power is transmitted from the power supply device to the controlled device through the communication sheet.

17. The information processing device according to claim 16,
wherein the controlled device is made to be a music player having the interface of the same configuration as the coupling node, and music digital content is transmitted from the central control device to a hard disk of the music player through the communication sheet.

18. An information processing device using a tape-form communication sheet which comprises coupling nodes, the coupling nodes, comprising:
a communication circuit unit comprising a signal In/Out unit, a memory, a signal reception/output unit, and CPU which is connected to the signal In/Out unit, the memory, and the signal reception/output unit; and
an arrayed antenna which is connected to the signal reception/output unit of the communication circuit unit, wherein the coupling nodes are fitted in a sheet body of the tape-form communication sheet and regularly lined in a plurality of rows, a signal transmission wiring is fitted entirely along the sheet body in a longitudinal direction, and the signal transmission wiring connects to the signal In/Out unit of the respective coupling nodes, wherein a same interface as the coupling node of the communication sheet is arranged on and mutually connected to respective surfaces of a container through a router, containers are adjacent to each other for forming a network through the interface, at least one container among a plurality of accumulated containers is adjacent and coupled with the coupling node of the communication sheet,
a central control device and a power supply device which have the same interface as the coupling node of the communication sheet are adjacent and coupled with the communication sheet and apart from the container of the communication sheet, and signal is mutually transmitted between the central control device and the container for managing the container.

19. An information processing device using a tape-form communication sheet which comprises coupling nodes, the coupling nodes, comprising:
a communication circuit unit comprising a power In/Out unit, a signal In/Out unit, a memory, a generator/rectifier, a signal reception/output unit, a charge/discharge battery, and CPU which is connected to the power In/Out unit, the signal In/Out unit, the generator/rectifier, the signal reception/output unit, and the charge/discharge battery through a selector; and
an arrayed antenna connected to the generator/rectifier and the signal reception/output unit of the communication circuit unit, wherein the coupling nodes are fitted in a sheet body of the tape-form communication sheet and regularly lined in a plurality of rows, a signal transmission wiring and a power transmission wiring are fitted entirely along the sheet body in a longitudinal direction, the signal transmission wiring connects to the signal In/Out unit of the respective coupling nodes, and the power transmission wiring connects to the power In/Out unit of the respective coupling nodes, wherein a same interface as the coupling node of the communication sheet is arranged on and mutually connected to respective surfaces of a container through a router, the containers are adjacent to each other for forming a network through the interface, at least one container among a plurality of accumulated containers is adjacent and coupled with the coupling node of the communication sheet, a central control device and a power supply device which have the same interface as the coupling node of the communication sheet are adjacent and coupled to the communication sheet and apart from the container of the communication sheet, power is supplied from the power supply device to the interface of the container through the communication sheet, and signal is mutually transmitted between the central control device and the container for managing the container.

20. An information processing device using a tape-form communication sheet which comprises coupling nodes, the coupling nodes, comprising:
   a communication circuit unit comprising a signal In/Out unit, a memory, a signal reception/output unit, and CPU which is connected to the signal In/Out unit, the memory, and the signal reception/output unit; and
   an arrayed antenna which is connected to the signal reception/output unit of the communication circuit unit, wherein the coupling nodes are fitted in a sheet body of the tape-form communication sheet and regularly lined in a plurality of rows, a signal transmission wiring is fitted entirely along the sheet body in a longitudinal direction, and the signal transmission wiring connects to the signal In/Out unit of the respective coupling nodes, wherein a short communication sheet which is made by cutting the communication sheet in appropriate length is wound around a container for forming an interface on the respective surfaces of the container, the containers are accumulated and mutual interfaces are adjacent and coupled for forming a network, at least one container among the plurality of accumulated containers is adjacent and coupled with the coupling node of the long communication sheet, a central control device which has the same interface as the coupling node of the communication sheet is adjacent and coupled with the communication sheet and apart from the container of the communication sheet, and a signal is mutually transmitted between the central control device and the container for managing the container.

21. An information processing device using a tape-form communication sheet which comprises coupling nodes, the coupling nodes, comprising:
   a communication circuit unit comprising a power In/Out unit, a signal In/Out unit, a memory, a generator/rectifier, a signal reception/output unit, a charge/discharge battery, and CPU which is connected to the power In/Out unit, the signal In/Out unit, the generator/rectifier, the signal reception/output unit, and the charge/discharge battery through a selector; and
   an arrayed antenna connected to the generator/rectifier and the signal reception/output unit of the communication circuit unit, wherein the coupling nodes are fitted in a sheet body of the tape-form communication sheet and regularly lined in a plurality of rows, a signal transmission wiring and a power transmission wiring are fitted entirely along the sheet body in a longitudinal direction, the signal transmission wiring connects to the signal In/Out unit of the respective coupling nodes, and the power transmission wiring connects to the power In/Out unit of the respective coupling nodes, wherein a short communication sheet which is made by cutting the communication sheet in appropriate length is wound around a container for forming an interface on the respective surfaces of the container, the containers are accumulated and mutual interfaces are adjacent and coupled for forming a network, at least one container among the plurality of accumulated containers is adjacent and coupled with the coupling node of the communication sheet, a central control device and a power supply device which have the same interface as the coupling node of the communication sheet are adjacent and coupled with the communication sheet and apart from the container of the communication sheet, power is supplied from the power supply device to the interface of the container through the communication sheet, and signal is mutually transmitted between the central control device and the container for managing the container.

22. An information processing device using a tape-form communication sheet which comprises coupling nodes, the coupling nodes, comprising:
   a communication circuit unit comprising a signal In/Out unit, a memory, a signal reception/output unit, and CPU which is connected to the signal In/Out unit, the memory, and the signal reception/output unit; and
   an arrayed antenna which is connected to the signal reception/output unit of the communication circuit unit, wherein the coupling nodes are fitted in a sheet body of the tape-form communication sheet and regularly lined in a plurality of rows, a signal transmission wiring is fitted entirely along the sheet body in a longitudinal direction, and the signal transmission wiring connects to the signal In/Out unit of the respective coupling nodes, wherein a short communication sheet which is made by cutting the tape-form communication sheet in appropriate length is wound around a muscle, a long communication sheet is adjacent and connected to the coupling node of the short communication sheet, a central control device which has a same interface as the coupling node of the communication sheet is adjacent and connected to the long communication sheet, and computation is conducted between the central control device and the respective coupling nodes of the short communication sheet for collecting myoelectric potential data of a muscle nerve bundle or a stimulation signal is sent to the muscle nerve bundle.

23. An information processing device using a long tape-form communication sheet which comprises coupling nodes, the coupling nodes, comprising:
   a communication circuit unit comprising a power In/Out unit, a signal In/Out unit, a memory, a generator/rectifier, a signal reception/output unit, a charge/discharge battery, and CPU which is connected to the power In/Out unit, the signal In/Out unit, the generator/rectifier, the signal reception/output unit, and the charge/discharge battery through a selector; and
   an arrayed antenna connected to the generator/rectifier and the signal reception/output unit of the communication circuit unit, wherein the coupling nodes are fitted in a sheet body of the tape-form communication sheet and regularly lined in a plurality of rows, a signal transmission wiring and a power transmission wiring are fitted entirely along the sheet body in a longitudinal direction, the signal transmission wiring connects to the signal In/Out unit of the respective coupling nodes, and the power transmission wiring connects to the power In/Out unit of the respective coupling nodes, wherein a short communication sheet which is made by cutting the tape-form communication sheet in appropriate length is wound around a muscle, a long communication sheet is adjacent and connected to the coupling node of the short communication sheet, a central control device which has a same interface as the coupling node of the communication sheet and a power supply device are adjacent and connected to the communication sheet, power is supplied from the power supply device to the respective coupling nodes of the short communication sheet through the communication sheet, and computation is conducted between the central control device and the respective coupling nodes of the short communication sheet for collecting myoelectric potential data of a muscle nerve bundle or a stimulation signal is sent to the muscle nerve bundle.

* * * * *